United States Patent [19]

von Wimmersperg

[11] Patent Number: 4,640,545
[45] Date of Patent: Feb. 3, 1987

[54] LOCK FOR VEHICLE INFANT RESTRAINT

[76] Inventor: Heinrich F. von Wimmersperg, 15721 Rosemont Rd., Detroit, Mich. 48223

[21] Appl. No.: 733,117

[22] Filed: May 13, 1985

[51] Int. Cl.[4] .......................... A47C 1/08; B60N 1/12
[52] U.S. Cl. ........................... 297/216; 292/DIG. 22; 297/250; 297/379
[58] Field of Search ...................... 297/216, 379, 250; 292/108, DIG. 22

[56] References Cited

U.S. PATENT DOCUMENTS

| | | | |
|---|---|---|---|
| 2,873,794 | 2/1959 | Leslie et al. | 297/379 |
| 4,082,353 | 4/1978 | Hollowell | 297/216 X |
| 4,118,067 | 10/1978 | Tanaka | 297/379 |
| 4,147,386 | 4/1979 | Stolper | 297/379 X |
| 4,429,919 | 2/1984 | Klueting et al. | 297/216 X |
| 4,480,870 | 11/1984 | von Wimmersperg | 297/216 |

Primary Examiner—James T. McCall
Assistant Examiner—Peter R. Brown
Attorney, Agent, or Firm—Barnes, Kisselle, Raisch, Choate, Whittemore & Hulbert

[57] ABSTRACT

A lock for an infant restraint used in a vehicle with a normally reclining shell in which a child is received. In a frontal crash the lock releases in the shell so that the shell and child pivot downwardly to a generally vertical position thereby greatly reducing the risk of injury and usually preventing injury of the child. To minimize the force required to release the lock, a roller bearing catch is engaged by a hook latch. The lock is normally latched and is released in a frontal crash by the inertia of a flyweight. To prevent the latch from being released during normal operation of the vehicle by forces produced by vibration, bumps and the like, preferably the flyweight and hook are connected by a lost motion coupling, a movable stop releasably engages the hook and the flyweight is yieldably biased toward the locked position.

20 Claims, 5 Drawing Figures

LOCK FOR VEHICLE INFANT RESTRAINT

FIELD OF THE INVENTION

This invention relates to an infant restraint for use in a vehicle and more particularly to a releasable lock for an infant restraint.

BACKGROUND OF THE INVENTION

U.S. Pat. No. 4,480,870 discloses an infant restraint with a shell for receiving a young child which is carried by a frame for mounting the restraint on a vehicle seat with the shell in a rearward facing direction and a comfortable, somewhat reclining position. The shell is pivotally mounted on the frame adjacent its upper end which is preferably supported by legs bearing on the vehicle floor. The lower end of the frame is retained on the seat by a conventional seat belt. Preferably, in normal use, the vehicle shell is retained in its comfortable, somewhat reclining position by a retaining means. In the event of a frontal crash, the retaining means yields and permits the shell to pivot or swing generally downwardly so that infant is supported and shielded by the back of the shell in a more erect or vertical position, thereby preventing ejection of the infant from the restraint and usually avoiding injury to the infant.

SUMMARY OF THE INVENTION

A lock for an infant restraint with a hook which is normally latched and in the event of a frontal collision is released by the inertia of a flyweight. To insure release of the hook and minimize the mass of the flyweight, the hook engages a bearing catch. Preferably, to insure the lock is not released during normal operation of the vehicle, even on rough and bumpy roads, the hook is positively restrained by a movable stop which is preferably also disengaged by the flyweight. Preferably, the flyweight is also yieldably biased toward the locked positioned.

Objects, features and advantages of this invention are to provide an infant restraint lock which is fail-safe, unaffected by forces produced by loading and unloading of the child and rough and bumpy roads over which the vehicle travels, easy to lock and unlock, rugged, durable, reliable, compact, lightweight, inexpensive, of simple design, economical to manufacture and assemble, and needs no service of maintenance when in use.

BRIEF DESCRIPTION OF THE DRAWING

These and other objects, features and advantages of this invention will be apparent from the following detailed description, appended claims and accompanying drawing in which:

DETAILED DESCRIPTION

Figure 1:
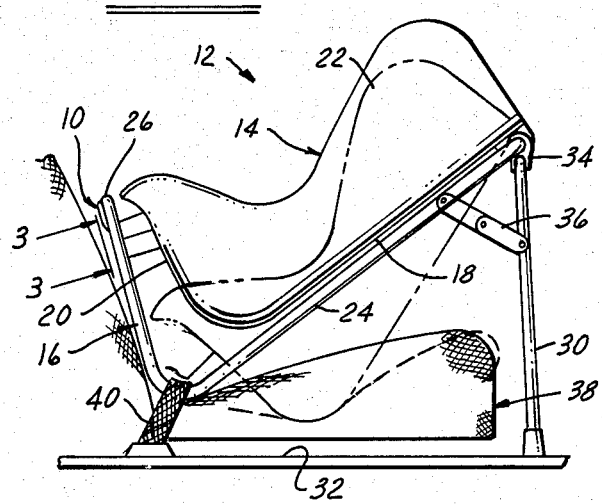
FIG. 1 is a side view of a lock embodying this invention mounted on an infant restraint secured by a seat belt to the rear seat of an automotive vehicle.
Figure 2:
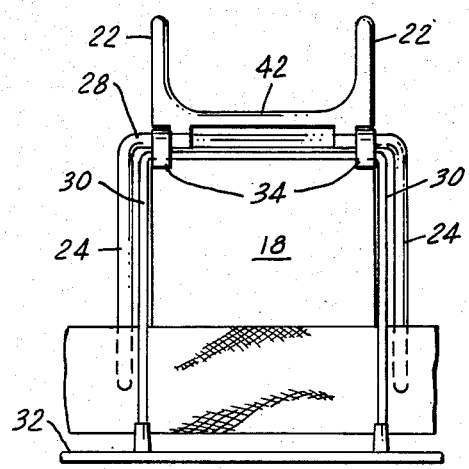
FIG. 2 is a front end view of the infant restraint and seat of FIG. 1.

FIG. 1 illustrates a lock 10 embodying this invention mounted on an infant restraint 12 with a shell or shield 14 pivotally mounted on a frame 16. The shell is preferably molded from plastic and the like in the form of a seat having an infant back and head support section 18 and a seat and leg support section 20 adjacent the lower end. The shell also has sidewalls 22 and preferably is open at its upper end.

The frame is tubular and has generally L-shaped side members 24 which are connected by cross bars 26 and 28 adjacent the ends of the shell. The upper end of the frame is supported by a pair of legs 30 which bear on a floor 32 of a vehicle (not shown) and are connected to the frame by hinges 34 and folding braces 36. The lower end of the frame is releasably secured adjacent the rear of the vehicle seat 38 by a conventional seat belt 40.

The upper end of the shell 14 is pivotally connected to the frame 16 by a hinge member 42 encircling the cross bar 28 of the frame and preferably integral with the shell. The lower end of the shell is releasably secured to the frame by the lock 10 in the solid line position shown in FIG. 1 and when the lock is released pivots downwardly to the position shown in phantom line. The construction and arrangement of the infant restraint 12 is disclosed and claimed in U.S. Pat. No. 4,480,870 issued Nov. 6, 1984, which is incorporated herein by reference. Hence, the construction and arrangement of the infant restraint will not be described in further detail.

Figure 4:
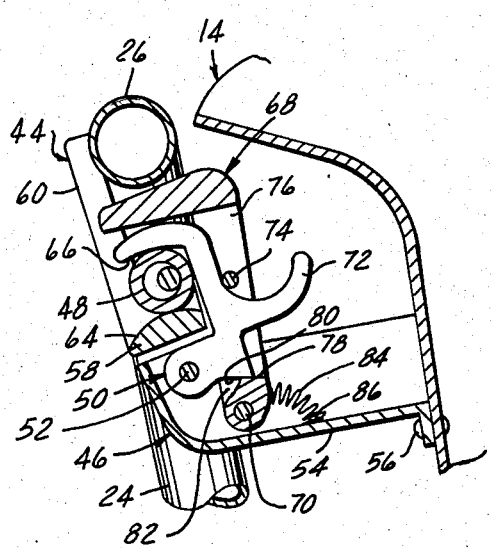
FIG. 4 is a sectional view of the lock taken generally on line 4—4 of FIG. 3 with its component parts shown in the latched position.

As shown in FIGS. 1 and 4, the lock has a catch assembly 44 fixed to the frame and a latch assembly 46 fixed to the shell. In accordance with one feature of this invention, to provide a fail-safe release of the lock and to minimize the force required to release it, the catch assembly has a roller bearing 48 which is releasably engaged by a hook 50 of the latch assembly. The hook 50 is pivoted on a pin 52 fixed to a housing 54 securing by a fastener 57 to the shell. The catch assembly has a bearing support 58 fixed to the lower end of a pair of spaced apart brackets 60 which are fixed adjacent their upper ends to the cross bar 28 of the frame. The roller bearing is retained between the brackets so that it can bear and roll on the support 58, by a pin 62 fixed to the brackets.

Preferably, the roller bearing 48 bears on an arcuate bearing race surface 64 on the support and is engaged by an arcuate bearing race surface 66 on the hook. To insure that the lock will neither jam nor release prematurely, preferably the arcuate race surfaces 64 and 66 have centers which are substantially coincident and preferably also substantially coincident with the axis of the pin 52 about which the hook 50 pivots. Preferably, the radius of each bearing race surface is also larger than the radius of the bearing.

In accordance with another feature of this invention, in a frontal crash, the lock is released by the inertia of a flyweight 68 pivotally mounted at one end on a pin 70 fixed to the housing 54. Even though in a crash the forces tending to keep the mechanism locked are relatively large, due to the roller bearing catch the lock can be released with a relatively small force, and hence, the flyweight 68 requires a relatively small mass of a few ounces to produce sufficient force by inertia to release the lock in a crash. To insure that the lock is not released by slight movement of the flyweight, such as that caused by vibration or rough roads over which the vehicle travels, the flyweight is connected to the hook 50 through a lost motion coupling provided by the cooperation of an arm 72 on the hook which is engagable by a pin 74 carried by the flyweight. A portion of the hook 50 extends into and the arm 70 projects through a clearance slot 76 in the flyweight.

To further insure ordinary vehicle operating conditions will not release the lock, a stop 78 on the flyweight underlies an abutment surface 80 on the hook when they are in the locked position shown in FIG. 4. A relief area 82 is provided adjacent the stop 78 so that it disengages the hook before the flyweight moves clockwise (as viewed in FIG. 4) sufficiently for the pin 74 to strike the arm 72 and begin to disengage the hook. Preferably the flyweight, and through it also the hook, are yieldably biased toward the fully locked position (as shown in FIG. 4) by a compression spring 84 with its ends received over retainers 86 and bearing on the flyweight and housing. Preferably, to further insure that the lock will not be released under ordinary operating conditions of the vehicle, the hook 50 has insufficient mass to produce by itself a sufficient force by inertia to release the lock.

Figure 3:
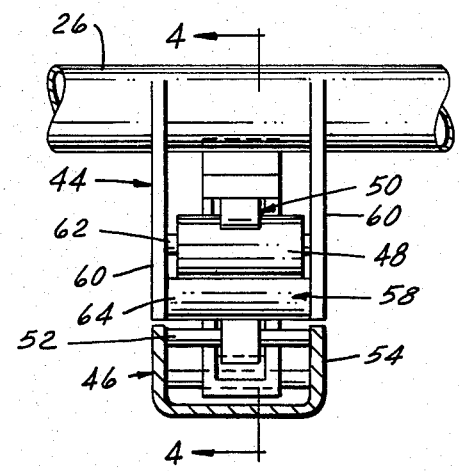
FIG. 3 is a fragmentary end view of the lock with portions broken away taken generally on line 3—3 of FIG. 1.

In use, the lock 10 is mounted on an infant restraint 12 which is installed in a vehicle with its legs 30 bearing on the floor 32 and the lower end of the frame secured in the vehicle seat 38 by a seat belt 40. The infant is placed in the shell with its head adjacent the upper end and its feet adjacent the lower end held therein by a lap belt (not shown) fixed to the shell. In normal operation, the lock 10 is latched or locked as shown in FIGS. 1, 3 and 4, so that the back of the shell 14 and hence the infant is inclined at an acute included angle to the vertical or legs of the restraint of about 40 to 50 degrees. In normal operation of the vehicle, the lock assembly remains latched or locked even if subjected to forces produced by vibration and movement of the vehicle over rough roads and the like. In normal operation, the hook 68 is prevented from being released by the positive stop 78 underlying the abutment 80 of the hook. The positive stop 78 will underlie the hook even if these forces are large enough to move the flyweight 68 slightly clockwise from the locked position shown in FIG. 4, and the flyweight will be returned to this fully locked position by the spring 84. Furthermore, even if these forces produced sufficient movement of the flyweight 68 to disengage the stop 78, the hook 50 will still not be released because of the lost motion coupling provided by the arm 72 and pin 74. Moreover, preferably the hook 50 has insufficient mass to be released by its own insertia during normal operation of the vehicle.

Figure 5:
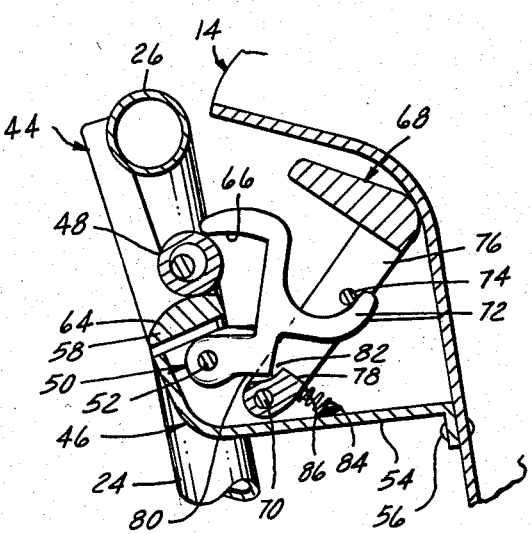
FIG. 5 is a sectional view similar to FIG. 4 showing the component parts of the lock in the released position.

However, in the event a forward moving vehicle is involved in a frontal crash, inertia of the flyweight 68 causes it to rotate clockwise to the position shown in FIG. 5 which causes the pin 74 to strike the arm 72 and the hook 50 to pivot clockwise sufficient to release the lock. In a frontal crash, the forces acting on the lock are relatively large, but the roller bearing catch 48 greatly decreases the resistance to movement of the hook 50 so that it is disengaged by a relatively small force produced by the interia of the flyweight 68. For example, in a frontal crash of a vehicle traveling at thirty miles per hour and producing a deceleration of 20G with a twenty pound child in a shell weighing five pounds, the lock can be released with a force of less than half a pound. In contrast, if the roller bearing 48 was eliminated and there was sliding friction between the hook and support 58 of the catch, a force of about 25 to 60 pounds would be required to release the lock.

As the hook 50 is being released, the roller bearing rolls clockwise along the arcuate surface 64 of the support 48 from the position shown in FIG. 4 to that shown in FIG. 5. When the parts of the lock move to the position shown in FIG. 5, the inertia of the child and shell cause them to pivot downwardly so that the shell assumes the position shown in phantom in FIG. 1. In this position, the shell and child are more nearly vertically oriented and typically at an acute included angle to the vertical of about 15° to 30° and usually about 20° to 25°. In this position, the back of the shell provides better support and protection for the trunk and head of the child and prevents the child from being propelled out of the shell through its upper end. Moreover, since during the rapid deceleration the infant's head and back are generally vertical, no substantial forces are generated tending to separate the infant's head from its trunk, thereby avoiding subjecting the infant's neck to injurious forces. Furthermore, the flexing of the seat cushion absorbs and dissipates some of the energy from the forces applied to the child and shell in a frontal crash which both cushions and protects the child and prevents them from rapidly springing back toward the reclining position. Together, all these factors greatly lession the risk of injury, decrease the severity of any injury and usually prevent injury to the child as a result of a frontal crash of the vehicle.

This infant restraint and lock also provides an anatomically correct riding position and permits the elimination of a shoulder harness to restrain an infant in a crash. Tests show that a lap belt is sufficient to restrain the infant in the shell in a frontal vehicle crash at 30 MPH which produces 20G of deceleration. A shoulder harness system is not only inefficient when applied to the fragile body of an infant, especially of a newborn and a premature baby, but it also causes considerable inconvenience for the vehicle operator and child. Statistics show, therefore, that it is very seldom used correctly. Thus, this infant restraint and lock provides not only improved mechanical performance in riding and increased safety in frontal crashes but also great ease and assurance of correct usage.

What is claimed is:

1. A lock for a child restraint for use in a vehicle comprising, a catch, a bearing carried by said catch and being releasably engageable by a hook a support for said bearing carried by said catch, a first arcuate surface on said support for engagement with said bearing, a latch, a hook carried by said latch and being movable to a first position wherein it engages said bearing to restrain movement in at least one direction of said latch with respect to said catch and to a second position wherein it is released from said bearing to permit movement in said one direction of said latch with respect to said catch, a second arcuate surface of said hook constructed and arranged to engage said bearing when said hook is in its first position, said bearing being a roller bearing disposed between said first and second surfaces when said hook is in its first position, a flyweight carried by said latch and movable from a first position to a second position due to inertia when the vehicle is rapidly decelerated in a frontal crash, a coupling of said flyweight with said hook so that when said flyweight moves to its second position said hook is moved to its second position to release said lock, and said flyweight has sufficient mass to produce sufficient force by inertia during such frontal crash to move said hook to its second position.

2. The lock of claim 1 which also comprises means retaining said bearing in said catch such that within predetermined limits it can roll on said first arcuate surface of said support as said hook moves from its first position to its second position.

3. The lock of claim 1 wherein the center of said first arcuate surface is at least substantially coincident with the center of said second arcuate surface.

4. The lock of claim 1 wherein the radii of said first and second arcuate surfaces are each larger than the radius of said roller bearing.

5. The lock of claim 1 which also comprises a pivot mounting said hook in said catch for generally pivotal movement to its first and second positions and wherein the centers of said first and second arcuate surfaces are each at least substantially coincident with the pivot point of said hook.

6. The lock of claim 1 which also comprises an abutment carried by said hook, a stop carried by said latch, movable to first and second positions by said flyweight and constructed and arranged such that when in its first position it cooperates with said abutment to prevent movement of said hook to the second position thereof and when in its second position clears said abutment and does not prevent movement of said hook to the second position thereof.

7. The lock of claim 6 which also comprises means yieldably biasing said flyweight toward its first position.

8. The apparatus of claim 1 which also comprises a pivot mounting said flyweight in said catch for pivotal movement to its first and second positions and means yieldably biasing said flyweight toward its first position.

9. The lock of claim 1 wherein said coupling comprises a lost motion means having a first member carried by said hook, a second member carried by said flyweight, and said members are constructed and arranged such that said flyweight can move from its first position partway toward its second position without engaging said members to move said hook from its first position.

10. The lock of claim 1 wherein said coupling comprises an arm carried by one of said hook and flyweight, a striker carried by the other of said hook and flyweight, and said arm and striker being constructed and arranged such that when said flyweight moves from its first position partway toward its second position said hook remains in its first position and when said flyweight moves fully to its second position said striker and arm engage to move said hook to its second position.

11. The lock of claim 10 which also comprises means yieldably biasing said flyweight toward its first position.

12. The lock of claim 10 wherein said hook has insufficient mass to be moved by inertia from its first position to its second position by a frontal crash of the vehicle.

13. The lock of claim 1 wherein said hook has insufficient mass to be moved by inertia from its first position to its second position by a frontal crash of the vehicle.

14. A lock for a child restraint for use in a vehicle comprising, a catch, a hook, a rotatable bearing carried by said catch and being releasably engageable by said hook, a latch, said hook pivotally carried by said latch and having an arcuate surface engagable with said bearing and being movable to a first position wherein said surface engages said bearing to restrain movement in at least one direction of said latch with respect to said catch and to a second position wherein said surface is released from said bearing to permit movement in said one direction of said latch with respect to said catch, a flyweight carried by said latch and movable from a first position to a second position due to inertia when the vehicle is rapidly decelerated in a frontal crash, a coupling of said flyweight with said hook so that when said flyweight moves to its second position said flyweight engages said hook to move said hook to its second position to release said lock, and said flyweight has sufficient mass to produce sufficient force by inertia during such frontal crash to move said hook to its second position.

15. The lock of claim 14 which also comprises an abutment carried by said hook, a stop carried by said latch, movable to first and second positions by said flyweight and constructed and arranged such that when in its first position it cooperates with said abutment to prevent movement of said hook to the second position thereof and when in its second position clears said abutment and does not prevent movement of said hook to the second position thereof.

16. The apparatus of claim 14 which also comprises a pivot mounting said flyweight in said catch for pivotal movement to its first and second positions and means yieldably biasing said flyweight toward its first position.

17. The lock of claim 14 wherein said hook has insufficient mass to be moved by inertia from its first position to its second position by a frontal crash of the vehicle.

18. The lock of claim 14 wherein said bearing comprises a roller bearing.

19. The lock of claim 14 wherein said coupling comprises a lost motion means having a first member carried by said hook, a second member carried by said flyweight, and said members are constructed and arranged such that said flyweight can move from its first position partway toward its second position without engaging said members to move said hook from its first position.

20. The lock of claim 19 wherein said hook has insufficient mass to be moved by inertia from its first position to its second position by a frontal crash of the vehicle.

* * * * *